United States Patent [19]

Negishi et al.

[11] Patent Number: 5,242,972

[45] Date of Patent: * Sep. 7, 1993

[54] FLUORINE BASED AQUEOUS DISPERSION, PROCESS FOR PREPARING THE SAME, AND FLUORINE BASED MATTE ANIONIC ELECTRODEPOSITION COATING COMPOSITION CONTAINING THE SAME

[75] Inventors: Hiroyuki Negishi; Shinji Shirai, both of Hiratsuka, Japan

[73] Assignee: Kansai Paint Co., Ltd., Amagasaki, Japan

[*] Notice: The portion of the term of this patent subsequent to Dec. 25, 2007 has been disclaimed.

[21] Appl. No.: 885,827

[22] Filed: May 20, 1992

Related U.S. Application Data

[63] Continuation of Ser. No. 504,666, Apr. 3, 1990, abandoned.

[30] Foreign Application Priority Data

Apr. 5, 1989 [JP] Japan .................................. 1-86462
Mar. 27, 1990 [JP] Japan .................................. 2-75725

[51] Int. Cl.⁵ ............................................. C08J 27/12
[52] U.S. Cl. ................................... 524/545; 524/547; 524/548
[58] Field of Search ..................... 524/545, 547, 548

[56] References Cited

U.S. PATENT DOCUMENTS

| | | | |
|---|---|---|---|
| 2,902,389 | 9/1959 | Keil | 117/72 |
| 3,061,467 | 10/1962 | Vincent | 117/127 |
| 3,175,921 | 3/1965 | Hedlund | 117/75 |
| 3,664,888 | 5/1972 | Oga et al. | 148/6.27 |
| 3,706,592 | 12/1972 | Thomson | 117/72 |
| 3,711,313 | 1/1973 | Nagano et al. | 117/19 |
| 3,734,784 | 5/1973 | Bereday et al. | 148/6.27 |
| 3,935,349 | 1/1976 | Terai et al. | 428/450 |
| 4,980,409 | 12/1990 | Harakawa et al. | 524/512 |

FOREIGN PATENT DOCUMENTS

| | | |
|---|---|---|
| 213058 | 11/1983 | Japan . |
| 75575 | 7/1989 | Japan . |
| 2-34608 | 3/1990 | Japan . |

*Primary Examiner*—Joseph L. Schofer
*Assistant Examiner*—Peter D. Mulcahy
*Attorney, Agent, or Firm*—Fisher, Christen & Sabol

[57] ABSTRACT

Disclosed are a matte fluorine based aqueous dispersion containing, as the resin component, a reaction product of a fluorine based polycarboxylic acid resin with an epoxysilane compound; a process for preparing the fluorine based aqueous dispersion, which process comprises dissolving or dispersing the fluorine based polycarboxylic acid resin and an alicyclic epoxysilane compound in an organic solvent to form an organic solution or organic dispersion, followed by heating and reacting until an acid value of the fluorine based polycarboxylic acid resin is reduced by one or more, incorporating a neutralizing agent and by dispersing in water, or which process comprises dissolving or dispersing the fluorine based polycarboxylic acid resin in an organic solvent to form an organic solution or organic dispersion, followed by adding an aliphatic epoxysilane compound after or before neutralization, dispersing in water, provided after neutralization when the aliphatic epoxysilane compound is added before neutralization, to form an aqueous dispersed system, and heating and reacting the aqueous dispersed system until the acid value of the fluorine based polycarboxylic acid resin is reduced by one or more; and a fluorine based matte anionic electrodeposition coating composition containing the fluorine based aqueous dispersion.

11 Claims, No Drawings

FLUORINE BASED AQUEOUS DISPERSION, PROCESS FOR PREPARING THE SAME, AND FLUORINE BASED MATTE ANIONIC ELECTRODEPOSITION COATING COMPOSITION CONTAINING THE SAME

This is a continuation of application Ser. No. 504,666, filed on Apr. 3, 1990, of Hiroyuki NEGISHI et al., for FLUORINE BASED AQUEOUS DISPERSION, PROCESS FOR PREPARING THE SAME, AND FLUORINE BASED MATTE ANIONIC ELECTRODEPOSITION COATING COMPOSITION CONTAINING THE SAME.

BACKGROUND OF THE INVENTION (1) Field of the Invention

This invention relates to a fluorine based aqueous dispersion, a process for preparing the same, and a fluorine based matte anionic electrodeposition coating composition containing the same.

(2) Description of the Prior Art

An aqueous coating composition has widely been used, because it uses water as a medium and is free of troubles about working atmosphere, danger of fire, and so forth. However, recent diversification in user's need shows a tendency to lose interest in feeling of metallic luster and highly demands matte coated film which provides grave feeling.

Japanese Patent Application Laid-Open No. 213058/83 discloses a resin composition for use in a matte anionic electrodeposition coating composition, which contains a product obtained by heating an aqueous emulsion containing $\alpha,\beta$-ethylenically unsaturated polycarboxylic acid resin and an epoxy compound as the film-forming components. The $\alpha,\beta$-ethylenically unsaturated polycarboxylic acid resin is a copolymer obtained by copolymerizing (a) $\alpha,\beta$-ethylenically unsaturated carboxylic acid, (b) a hydroxyalkyl-containing ester, amide or amide derivative of $\alpha,\beta$-ethylenically unsaturated carboxylic acid and (c) an alkyl ester of $\alpha,\beta$-ethylenically unsaturated carboxylic acid. The film finally formed from the above copolymer has such drawbacks as to show poor properties in weather resistance, chemical resistance, etc. On the other hand, the epoxy compound to be reacted with $\alpha,\beta$-ethylenically unsaturated polycarboxylic acid resin may includes epoxy compounds containing at least one epoxy group in one molecule. However, the use of a monoepoxy compound having one epoxy group in one molecule as the epoxy compound for forming a matte film has such drawbacks that the monoepoxy compound has no compatibility with the polycarboxylic acid resin and it is essential to use ones having a high molecular weight, and that the presence of the monoepoxy compound prevents water dispersibilization, resulting in not obtaining an electrodeposition coating composition having good stability, and further has such drawbacks that the coated film has high gloss and that it is impossible to obtain a film having good mechanical properties. On the other hand, the use of a polyepoxy compound having at least two epoxy groups has such drawbacks that the stabilization of the emulsion is spoiled during heating of the emulsion, resulting in producing coarse particles and agglomerates in the emulsion, and that an electrodeposited film formed by subjecting the resulting emulsion containing the coarse particles and agglomerates to the electrodeposition coating is highly hydrophobic and shows poor suitability for a water-washing treatment to remove an electrodeposition coating composition which has electrodeposited excessively with water, and the coated film shows poor finish appearance.

Japanese Patent Application Laid-Open No. 75575/89 discloses a resin composition for use in the electrodeposition coating, which composition comprises a fluorine-containing polymer having carboxyl group and hydroxyl group, and an organoalkoxysilane compound as the film-forming components. The above resin composition is such a resin composition as to be prepared from a resin composition for use in the electrodeposition coating, which contains a fluorine-containing polymer having carboxyl group and hydroxyl group and an amino resin as the film-forming components, by using the organoalkoxysilane compound in place of the amino resin as the crosslinking agent in order to improve properties such as weather resistance, heat resistance, electrical insulating properties, and the like. However, it is difficult to obtain a matte film from the resin composition disclosed as above.

SUMMARY OF THE INVENTION

It is an object of the present invention to provide a fluorine based aqueous dispersion capable of matting and having good storage stability, a process for preparing the fluorine based aqueous dispersion, and a fluorine based matte anionic electrodeposition coating composition capable of forming a film with good appearance.

The present invention provides a matte fluorine based aqueous dispersion containing, as the resin component, a reaction product of a fluorine based polycarboxylic acid resin with an epoxysilane compound; a process for preparing the fluorine based aqueous dispersion, which process comprises dissolving or dispersing the fluorine based polycarboxylic acid resin and an alicyclic epoxysilane compound in an organic solvent to form an organic solution or organic dispersion, followed by heating and reacting until an acid value of the fluorine based polycarboxylic acid resin is reduced by one or more, incorporating a neutralizing agent and by dispersing in water, or which process comprises dissolving or dispersing the fluorine based polycarboxylic acid resin in an organic solvent to form an organic solution or organic dispersion, followed by adding an aliphatic epoxysilane compound after or before neutralization, dispersing in water, provided after neutralization when the aliphatic epoxysilane compound is added before neutralization, to form an aqueous dispersed system, and heating and reacting the aqueous dispersed system until the acid value of the fluorine based polycarboxylic acid resin is reduced by one or more; and a fluorine based matte anionic electrodeposition coating composition containing the fluorine based aqueous dispersion.

DETAILED DESCRIPTION OF THE INVENTION

The fluorine based polycarboxylic acid resin used as the resin component of the fluorine based aqueous dispersion in the present invention may include a fluorine based polycarboxylic acid polymer prepared by subjecting a polybasic acid anhydride and a hydroxyl group-containing fluorine based polymer obtained by copolymerizing a hydroxyl group-containing radically polymerizable unsaturated monomer, fluoroolefin, and, when needed, other radically polymerizable unsaturated monomer to esterification reaction so as to partly or completely esterify the hydroxyl groups in the polymer, and containing carboxyl group and hydroxyl group or containing carboxyl group.

The hydroxyl group-containing radically polymerizable unsaturated monomer may include ones having hydroxyl group and radically polymerizable unsaturated double bond which is radically copolymerizable with fluoroolefin, and specific examples thereof may include hydroxyalkyl vinyl ether such as hydroxyethyl vinyl ether, hydroxypropyl vinyl ether, hydroxybutyl vinyl ether, hydroxypentyl vinyl ether and the like, and hydroxyallyl ether such as ethylene glycol monoallyl ether, diethylene glycol monoallyl ether, triethylene glycol monoallyl ether and the like.

The fluoroolefin may include ones represented by the following general formula:

where $R_1$, $R_2$ and $R_3$ represent H, F and Cl, and may be same or different. Specific examples thereof may include vinyl fluoride, vinylidene fluoride, ethylene trifluorochloride, ethylene tetrafluoride and the like. Of these, ethylene tetrafluoride and ethylene trifluorochloride are preferred from the standpoints of obtaining a matte film having good durability and appearance.

The other radically polymerizable unsaturated monomer has an unsaturated double bond which is radically copolymerizable with the fluoroolefin, and may be selected from the conventional monomers to be used depending on required film properties. Specific examples thereof may include α-olefins such as ethylene, propylene, isobutylene, butylene-1 and the like; vinyl ethers such as ethyl vinyl ether, isobutyl vinyl ether, butyl vinyl ether, cyclohexyl vinyl ether and the like; fatty acid vinyl esters such as vinyl acetate, vinyl lactate, vinyl butyrate, vinyl isobutyrate, vinyl caproate, vinyl pivalate, vinyl caprylate and the like; fatty acid isopropenyl esters such as isopropenyl acetate, isopropenyl propionate and the like; and the like.

The formulation of the above monomers may be composed of 3–80% by weight, preferably 5–50% by weight of hydroxyl group-containing radically polymerizable unsaturated monomer, 20–80% by weight, preferably 30–70% by weight of fluoroolefin and 0–77% by weight, preferably 10–65% by weight of other radically polymerizable unsaturated monomer.

The above copolymerization reaction is normally carried out in the presence of a polymerization initiator in a water-soluble organic solvent at a temperature of $-20°$ to $150°$ C., preferably $5°$ to $95°$ C. under a pressure of 0 to 30 kg/cm².G, preferably 0 to 10 kg/cm².G.

Examples of the water-soluble organic solvent include ketones such as acetone, methyl ethyl ketone, cyclohexanone and the like; alcohols such as methanol, ethanol, i-propanol, t-butanol, n-butanol and the like; ethers such as dimethyl carbitol, cellosolve, tetrahydrofuran and the like; amides such as dimethyl formamide, dimethyl acetoamide and the like; acetic esters such as methyl cellosolve acetate and the like; and the like.

Examples of the polymerization initiator include peroxides such as di-i-propylperoxydicarbonate, t-butylperoxybutylate, benzoyl peroxide and the like; azo compounds such as azobis-isobutyronitrile, azobisvaleronitrile and the like.

The fluorine based polycarboxylic acid polymer used in the present invention may include a polymer which is prepared by reacting the hydroxyl group-containing fluorine based polymer with a polybasic acid anhydride to convert at least a part of the hydroxyl groups in the polymer to an ester group represented by the formula:

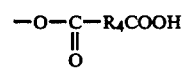

where
$R_4$ represents a bivalent organic group.

Examples of the polybasic acid anhydride may include maleic anhydride, itaconic anhydride, succinic anhydride, phthalic anhydride, anhydrous 1,2-cyclohexane dicarboxylic acid and the like.

The esterification reaction between the copolymer and the polybasic acid anhydride may normally be carried out in the presence of a catalyst at about $30°–100°$ C. and for about 1–10 hours. Examples of the catalyst may include zirconium naphthenate, tetrabutyl titanate and the like. A reacting molar ratio of the copolymer to the polybasic acid anhydride is about 1/0.5 to 1/5. The catalyst is used in an amount of about 0.01 to 1 parts by weight per 100 parts by weight of the copolymer.

The fluorine based polycarboxylic acid polymer by use of the fluoroolefin may also include, for example, a copolymer which is obtained by copolymerizing a carboxyl group-containing radically polymerizable unsaturated monomer obtained by reacting the hydroxyl group-containing radically polymerizable unsaturated monomer such as hydroxyalkyl vinyl ether and/or hydroxyaryl ether and the polybasic acid anhydride with the fluoroolefin and, when needed, the hydroxyl group-containing radically polymerizable unsaturated monomer, and other radically polymerizable unsaturated monomer, when needed. The formulation of the above monomers may be composed of 2–40% by weight, preferably 4–30% by weight of the carboxyl group-containing radically polymerizable unsaturated monomer, 20–80% by weight, preferably 30–70% by weight of fluoroolefin, 0–40% by weight, preferably 2–30% by weight of the hydroxyl group-containing radically polymerizable unsaturated monomer and 0–74% by weight, preferably 10–64% by weight of other radically polymerizable unsaturated monomer.

The fluorine based polycarboxylic acid resin used in the present invention may also include a copolymer obtained by copolymerizing a monomer having perfluoroalkyl group or perfluoroalkenyl group on one terminal and having ethylenical double bond on the other terminal, an ethylenically unsaturated carboxylic acid, a hydroxyl group-containing radically polymerizable unsaturated monomer and other radically polymerizable unsaturated monomer.

Preferable examples of the monomer having perfluoroalkyl group or perfluoroalkenyl group on one terminal and having ethylenical double bond on the other terminal may include perfluorobutylethyl methacrylate, perfluorooctylethyl methacrylate, perfluoroisononylethyl methacrylate, perfluorodecylethyl methacrylate and the like.

Preferable examples of the ethylenically unsaturated carboxylic acid may include acrylic acid, methacrylic acid, maleic acid, maleic anhydride, fumaric acid, crotonic acid, itaconic acid and the like.

Preferable examples of the hydroxyl group-containing radically polymerizable unsaturated monomer may include 2-hydroxyethyl acrylate, hydroxypropyl acrylate, 2-hydroxyethyl methacrylate, hydroxypropyl methacrylate and the like.

Preferable examples of the other radically polymerizable unsaturated monomer may include $C_{1-18}$ alkyl esters of acrylic acid or methacrylic acid, for example, methyl acrylate, ethyl acrylate, propyl acrylate, isopropyl acrylate, butyl acrylate, hexyl acrylate, octyl acrylate, lauryl cyclohexyl acrylate, methyl methacrylate, ethyl methacrylate, propyl methacrylate, isopropyl methacrylate, butyl methacrylate, hexyl methacrylate, octyl methacrylate, lauryl methacrylate and the like; vinyl aromatic monomers such as styrene, α-methylstyrene, vinyl toluene and the like; amide compounds of acrylic acid or methacrylic acid, and derivatives thereof; acrylonitrile, methacrylonitrile and the like.

The formulation of the above monomers may be composed of about 10–90% by weight, preferably 20–90% by weight of the monomer having perfluoroalkyl group or perfluoroalkenyl group on one terminal and having ethylenical double bond on the other terminal, about 2–30% by weight, preferably about 4–20% by weight of ethylenically unsaturated carboxylic acid, about 0–40% by weight, preferably about 2–30% by weight of hydroxyl group-containing radically polymerizable unsaturated monomer, and about 0–88% by weight, preferably about 0–74% by weight of the other radically polymerizable unsaturated monomer.

The copolymerization reaction is normally carried out in the presence of a polymerization initiator in a water-soluble organic solvent at a temperature of about 40°–250° C., preferably about 50°–180° C. for about 1–24 hours. The water-soluble organic solvent and the polymerization initiator may include those as above mentioned.

Use of the copolymer of the fluoroolefin as the fluorine based polycarboxylic acid resin makes it possible to obtain one having a structure in which carboxylic acid presents on a side chain in a form separate from fluorine atom bonded onto a main chain resulting in providing such an advantage that the following reaction of the carboxylic acid with the epoxysilane compound can easily be carried out. Further, the film formed by use of the above copolymer shows good properties in weather resistance, chemical resistance, etc. to be desirably used.

The resin thus obtained has carboxyl group as an essential ingredient in the resin, and the carboxyl group is not only a group necessary for water-dispersification, but also a group to be used for a reaction with epoxy group in the epoxysilane compound. The carboxyl group is contained preferably in such an amount that an acid value of the resin is 20–200, preferably 30–100, and that the acid value of the resin after the completion of the reaction with the epoxysilane compound is 19–199, preferably 30–100. When the acid value of the resin after the reaction is less than 19, the aqueous dispersion may show poor stability, and on the other hand, when the above acid value is more than 199, the film may show poor durability.

The fluorine based polycarboxylic acid resin may have a number average molecular weight of about 2000–100000, preferably about 5000–80000. When the molecular weight is less than about 2000, matting effect of the film may be reduced, and weather resistance, water resistance, etc. of the film may also be reduced. On the other hand, when the molecular weight is more than 100000, a film being coated shows poor melt flowability, and a matte film, which shows undesirably poor smoothness, may be obtained.

The fluorine based polycarboxylic acid used in the aqueous dispersion of the present invention preferably has hydroxyl group in addition to carboxyl group. The above hydroxyl group may be applied to a crosslinking reaction with amino resin, block polyisocyanate compound, etc. The above hydroxyl group may desirably be contained in such an amount that the hydroxyl value is normally about 10–200, preferably about 20–100.

Examples of the above amino resin may include melamine, urea, benzoguanamine, acetoguanamine, formaldehyde adduct of mixtures thereof and alcohol etherified compounds thereof, and it is not necessary for the amino resin to be water-soluble.

The block polyisocyanate may be prepared by reacting a polyisocyanate compound with a blocking agent such as alcohol, phenol or the like. Examples of the isocyanate compound may include tolylene diisocyanate, 4,4'-diphenylmethane diisocyanate, o-xylylene diisocyanate, m-xylylene diisocyanate, p-xylylene diisocyanate, hexamethylene diisocyanate, lysine diisocyanate, 4,4'-methylene bis(cyclohexyl isocyanate), methylcyclohexane 2,4(2,6)diisocyanate, 1,3-(isocyanate methyl)cyclohexane, isophorone diisocyanate, trimethylhexamethylene diisocyanate and the like.

The above amino resin and block polyisocyanate may be used separately alone or in combination. They are used in an amount of 50% by weight or less on the basis of the amount of solids of the resin.

The epoxysilane compound used for reacting with the above fluorine based polycarboxylic acid resin has one epoxy group and at least one of hydroxysilane group and/or a hydrolyzable group directly bonded to silicon atom in one molecule.

The hydrolyzable group directly bonded to silicon atom is a residual group which is hydrolyzed with water or moisture to form hydroxysilane group. Examples thereof may include hydrogen atom; $C_{1-5}$ alkoxyl group; aryloxy group such as phenoxy group, tolyloxy group, paramethoxyphenoxy group, paranitrophenoxy group, benzyloxy and the like, acyloxyl group such as acetoxy group, propionloxy group, butanoyloxy group, benzoyloxy group, phenylacetoxy group, formyloxy group and the like; a residual group represented by the following formula:

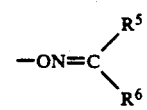

where $R^5$ and $R^6$ are $C_{1-5}$ alkyl group and same or different, and the like. Of these, alkoxyl group and acyloxyl group are preferred, because they are easily hydrolyzed to form hydroxysilane.

Preferably, the epoxysilane compound may include an aliphatic epoxysilane compound represented by the general formula (I):

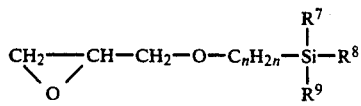  (I)

where $R^7$, $R^8$ and $R^9$ represent $C_1$-$C_4$ alkoxyl group, acyl group, $C_1$-$C_4$ alkyl group and phenyl group, provided that at least two of $R^7$, $R^8$ and $R^9$ are alkoxyl group and/or acyl group, an n is an integer of 1 to 4, specifically

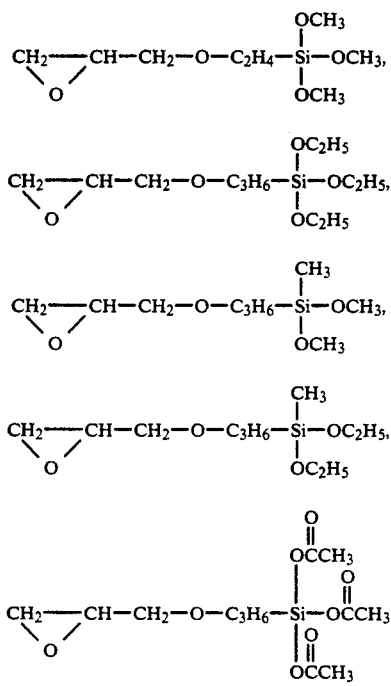

and the like;

an alicyclic epoxysilane compound represented by the following general formula (II):

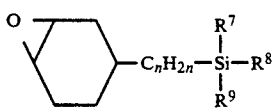  (II)

where $R^7$, $R^8$ and $R^9$ are as above defined, n is an above defined, specifically

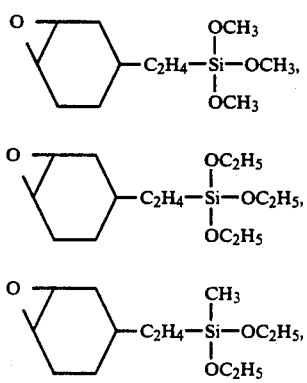

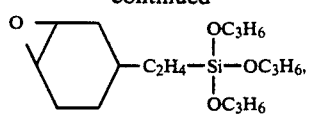

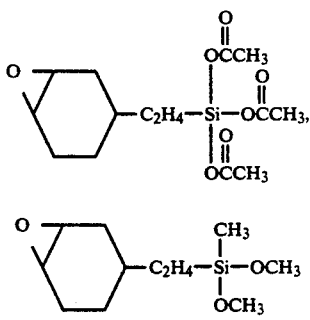

and the like;

an aliphatic or alicyclic epoxypolysilane compound obtained by reacting the epoxysilane compound and polysilane compound (for example, tetramethoxysilane, tetrapropoxysilane, methyltrimethoxysilane, ethyltriethoxysilane, propyltripropoxysilane, dimethyldimethoxysilane, diethyldiethoxysilane, dipropylpropoxysilane, diethyldisilanol, diphenyldiethoxysilane and the like); a copolymer of an aliphatic epoxy group-containing polymerizable unsaturated monomer such as glycidyl(meth)acrylate and allyl glycidyl ether or an alicyclic epoxy group-containing polymerizable unsaturated monomer such as 3,4-epoxycyclohexylmethyl(meth)acrylate and the like, a polymerizable unsaturated monomer having hydroxysilane group and a hydrolyzable group bonded directly to silicon atom, for example, vinyltris($\beta$-methoxyethoxy)silane, vinyltriethoxysilane, vinyltrimethoxysilane, $\gamma$-(meth)acryloxypropyltrimethoxysilane, 2-styrylethyltrimethoxysilane, $\gamma$-(meth)acryloxypropyltrimethoxysilane and the like, as the essential monomer components; and the like. Of these, the epoxysilane compounds represented by the general formulas (I) and (II), which are capable of forming a matte film having good appearance in a small amount thereof and providing an aqueous dispersion having good stability, are preferred.

The above epoxy silane compounds may be used alone or in combination.

The epoxysilane compound may be used in an amount of about 0.1–20 parts by weight, preferably about 0.5–10 parts by weight per 100 parts by weight of the fluorine based polycarboxylic acid resin. When the above amount is less than about 0.1 part by weight, it is impossible to obtain a satisfactory matte film. On the other hand, the above amount is more than about 20 parts by weight, stability of the aqueous dispersion may be reduced.

The aqueous dispersion of the present invention is prepared by a process which comprises dissolving or dispersing the fluorine based polycarboxylic acid resin and the epoxysilane compound in an organic solvent to form an organic solution or an organic dispersion, followed by heating and reacting until an acid value of the fluorine based polycarboxylic acid resin is reduced by one or more, preferably two or more, incorporating a basic neutralizing agent, and by dispersing in water. The use of the epoxysilane compound having alicyclic epoxy group provides such advantages that since the reaction between carboxyl group and epoxy group is carried out under an acidic atmosphere, a ring opening of the alicyclic epoxy group is rapidly carried out and the speed of the reaction with carboxyl group in the resin is increased. The heating condition may arbitrarily be selected from such conditions that the acid value of the resin may be within the above range, but is normally at about 40° C. to reflux temperature, preferably about 60° to 150° C. for about one to 20 hours, preferably about one to 15 hours.

The basic neutralizing agent may include conventionally known basic compounds, and examples thereof may include ammonia, dimethylamine, trimethylamine, diethylamine, triethylamine, diisopropylamine, butylamine, monoethanolamine, diethanolamine, triethanolamine, monoisopropanolamine, diisopropanolamine, triisopropanolamine, N-methylethanolamine, N-aminoethylethanolamine, N-methyldiethanolamine, polyglycolamine and the like. These neutralizing agent may be used in an amount of about 0.3–1.2 equivalents relative to the carboxyl group of the fluorine based polycarboxylic acid resin.

The aqueous dispersion of the present invention may also be prepared by a process which comprises dissolving or dispersing the fluorine based polycarboxylic acid resin in the organic solvent to form an organic solution or organic dispersion, followed by adding the epoxysilane compound after or before neutralization, dispersing in water, provided after neutralization when the epoxysilane compound is added before neutralization, to form an aqueous dispersed system having a pH of 7.0 or higher, and heating and reacting the aqueous dispersed system until the acid value of the fluorine based polycarboxylic acid resin is reduced by one or more, preferably two or more. The acid value may be determined after dissolving the aqueous dispersed system in the organic solvent. The heating condition may arbitrarily be selected from such conditions that the acid value of the resin is within the above range, but is normally at about 40° C. to reflux temperature, preferably about 40° to 80° C. for about one to 24 hours.

When the copolymer with fluoroolefin is used as the fluorine based polycarboxylic acid resin, the copolymer generally has such a low glass transition temperature that heating the aqueous dispersed system, for example, at a temperature higher than 80° C. results in taking place fusion between dispersed particles, reducing the stability of the aqueous dispersed system, and in producing coarse particles and agglomerates in the aqueous dispersed system, whereas the use of the aliphatic epoxysilane compound having aliphatic epoxy group as the epoxysilane compound provides such advantages that the ring opening of the aliphatic epoxy group under a basic atmosphere in the above reaction system is so easily carried out that the speed of the reaction with carboxyl group in the resin is increased, resulting in making it possible to carry out the reaction at relatively low temperatures.

The aqueous dispersion of the present invention may include, when needed, color pigments, extender pigment, film surface regulating agent, etc.

The aqueous dispersion of the present invention may have a solids content of normally about 3–60% by weight, preferably about 7–45% by weight.

The aqueous dispersion of the present invention may be used alone or in combination with other aqueous gloss coating composition, etc. The other aqueous gloss coating composition may include those obtained by incorporating a crosslinking agent such as melamine resin, polyisocyanate compound or the like into the conventionally known basic resin such as acrylic resin, fluorine based resin or the like without special limitations. When used in combination, it is used in an amount of 10 parts by weight or more, preferably 20 parts by weight of a resin solids content in the aqueous dispersion per 100 parts by weight of a resin solids content in the aqueous gloss coating composition.

The aqueous dispersion of the present invention may be coated by means of, for example, dip coating, roller coating, brushing, flow coating, spray coating, electrodeposition coating, etc. The coating film thickness may be normally in the range of about 5 $\mu$m to 100 $\mu$m, preferably about 10 $\mu$m to 80 $\mu$m. The heat curing may be carried out normally at room temperature to 250° C. for 10 minutes to 24 hours.

For example, explanations are given on the case where the aqueous dispersion of the present invention is subjected to the electrodeposition coating as follows.

The electrodeposition coating process and the apparatus used therefor may be selected from the conventional process known per se and used in the anode electrodeposition coating and the apparatus therefor. The electrodeposition coating is preferably carried out generally under conditions of a bath temperature of 20°–30° C., a coating voltage of 100–400V, preferably 100–300V and an application time of 30 seconds to 10 minutes. The coated dry film thickness may be normally in the range of about 2 to 50 $\mu$m, preferably about 5 to 30 $\mu$m.

Examples of the object to be subjected to electrodeposition coating may include electrically conductive materials such as iron, steel, copper, aluminum, a plated steel sheet, the surface of which is plated with zinc, tin, chromium, aluminum, etc., a metal material prepared by subjecting the surface of a steel to the chemical treatment with chromic acid, phosphoric acid, etc. or to the electrolytic treatment, etc. Of these, articles having various shapes such as sheet, bar, hollow, etc. of anodized aluminum are preferred.

The electrodeposition coating film formed on the object to be coated is removed from the electrodeposition coating bath, followed by washing an excessive amount of coating composition attached on the electrodeposition coating film with water, a filtrate from ultrafiltration, a permeated water from the reverse osmosis process, etc., and by heat curing normally at about 150°–220° C., preferably about 160°–200° C. for about 10–60 minutes, preferably about 20–40 minutes.

As above described, the resin component of the aqueous dispersion in the present invention is composed of a fluorine based resin obtained by reacting the fluorine based polycarboxylic acid resin with the epoxysilane compound and having carboxyl group and hydroxysilane group and/or hydrolyzable group bonded directly to silicon atom. The epoxy group in the epoxysilane compound is chemically bonded with the carboxyl group in the fluorine based polycarboxylic acid resin, resulting in making it possible to easily introduce hydroxysilane group and/or hydrolyzable group directly bonded to silicon atom into the resin. Regarding to hydroxysilane group and hydrolyzable group bonded directly to silicon atom, during water dispersification, when the hydrolyzable group bonded directly to silicon atom presents, hydrolysis takes place to form hydroxysilane group, followed by a condensation reaction between hydroxysilane groups or a condensation reaction between hydroxysilane group and hydrolyzable group bonded directly to silicon atom.

The above condensation reaction results in that the interior of particles in the aqueous dispersed system has a gel structure, and that a large amount of hydrophilic hydroxysilane groups present on the surface of the above particles to form fine and stable aqueous dispersed particles with the result that storage stability is improved. Regarding to a coated film by use of the resulting aqueous dispersion, reaction between hydroxysilane groups on the surface of the particle results in reducing flowability to form a fine and matte film surface. Generally an electrodeposited and coated film obtained by subjecting a coating composition prepared by use of a fluorine based polycarboxylic acid resin to the electrodeposition coating is so highly hydrophobic that washing of the electrodeposition coating composition, which has excessively been attached, with water, etc. results in that the surface of the film does not uniformly get wet with water, but water gathers and remains on the film in the form of lines or drops to cause the film to produce defects such as uneven gloss, whereas a coated film obtained by subjecting the fluorine based aqueous dispersion to the electrodeposition coating is so highly hydrophilic that applicability to the washing treatment with water, i.e. the treatment to remove excessively attached electrodeposition coating composition with water, etc. is improved, resulting in making it possible to obtain a finely finished matte film. Moreover, a reaction between hydroxysilane groups on the surface of the above particles takes place during the electrodeposition coating film is heat cured to form a polysiloxane linkage, resulting in making it possible to form a matte film having good properties in weather resistance, chemical properties, mechanical properties, etc.

The present invention will be explained more in detail by the following Examples and Comparative Examples, in which "part" and "%" all mean "part by weight" and "% by weight" respectively.

PREPARATION EXAMPLE 1

Preparation of Polycarboxylic Acid Resin (I)

An autoclave (50 kg/cm² pressure-resistant) is charged with 106 parts of hydroxybutyl vinyl ether, 60 parts of diglyme, 180 parts of isopropanol and 1 ml of N-dimethylbenzylamine, followed by replacing air therein with nitrogen, adding 116 parts of chlorotrifluoroethylene, and heating up to 65° C.

Next, 40 parts of a mixture of diglyme and isopropyl alcohol in a weight ratio of 1:1 and containing 2.5 parts of azobisisobutylonitrile dissolved therein is added to start polymerization reaction followed by maintaining at that temperature for 20 hours with agitation to obtain 475 parts of an organic solvent solution of a hydroxyl group-containing resin having a solid content of 42%.

The resulting solution is heated to 60°-80° C. under vacuum to remove the solvent, followed by adding 109 parts of 1,2-cyclohexane-dicarboxylic acid anhydride and 100 μl of zirconium naphthenate with agitation, and heating to react for 5 hours.

The resulting reaction mixture is cooled down to room temperature, followed by adding butyl cellosolve so as to obtain an organic solvent solution of a polycarboxylic acid resin, a solid content of which is 50%. The hydroxyl value and acid value of the resin thus obtained are determined according to the methods defined in JIS K 0070 to be 25 and 100 respectively. The number average molecular weight of the above resin is determined according to gel permeation chromatography to be 30,000.

PREPARATION EXAMPLE 2

Preparation of Polycarboxylic Acid Resin (II)

A reactor is charged with 100 parts of isopropyl alcohol and is kept at 80° C., and a mixture of 15 parts of styrene, 20.2 parts of methyl methacrylate, 42 parts of 2-perfluorooctylethyl methacrylate, 10 parts of 2-hydroxyethyl acrylate, 12.8 parts of acrylic acid and 1.0 part of azobisisobutylonitrile is dropped over 3 hours, followed by keeping at that temperature for 3 hours to obtain an organic solvent solution of polycarboxylic acid resin (II), a solid content of which is 50%. The resulting resin has a number average molecular weight of about 30000, a hydroxyl value of 50 and an acid value of 100.

PREPARATION EXAMPLE 3

Preparation of Polycarboxylic Acid Resin (III)

A reactor is charged with 100 parts of isopropyl alcohol and is kept at 80° C., and a mixture of 15 parts of styrene, 30 parts of methyl methacrylate, 32.2 parts of n-butyl acrylate, 10 parts of 2-hydroxyethyl acrylate, 12.8 parts of acrylic acid and 1.0 part of azobisisobutylonitrile is dropped thereinto over 3 hours, followed by keeping at that temperature for 3 hours to obtain an organic solvent solution of polycarboxylic acid resin (III), a solid content of which is 50%. The resulting resin thus obtained has a number average molecular weight of about 30000, a hydroxyl value of 50 and an acid value of 100.

EXAMPLE 1

To 200 parts of a 50% organic solvent solution of polycarboxylic acid resin (I) are added 5 parts of a

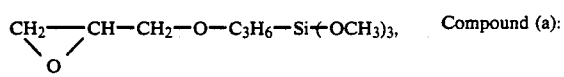

42 parts of MELAN 620 (melamine resin, solid content: 70%, marketed by Hitachi Kasei Kogyo Co., Ltd.) and triethylamine in an amount of 0.8 equivalent relative to the carboxyl group in polycarboxylic acid resin (I) to be uniformly mixed so that the following aqueous dispersion may have a pH in the range of 7.5 to 9.0. Next, to the above mixture is added with agitation 1096 parts of deionized water to obtain an aqueous dispersion having a solid content of 10%. The aqueous dispersion is heated at 40° C. for 12 hours with agitation to obtain an aqueous dispersion of Example 1.

EXAMPLES 2–11

Respective aqueous dispersions are prepared in the same manner as in Example 1 according to the formulations shown in Table 1, followed by heating under the conditions shown in Table 1 to obtain aqueous dispersions of Examples 2–11 respectively.

COMPARATIVE EXAMPLES 1–6

Respective aqueous dispersions are prepared according to the formulations shown in Table 1, followed by heating under the conditions shown in Table 1 to obtain aqueous dispersions of Comparative Examples 1-6 respectively.

Compounds (b), (c), (d) and (e) shown in Table are as follows.

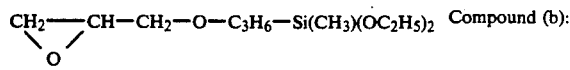 Compound (b):

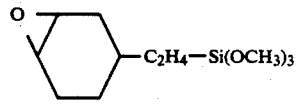 Compound (c):

methyltrimethoxysilane Compound (d):
polyethylene glycol diglycidyl ether Compound (e):

PREPARATION OF SAMPLE

Respective aqueous dispersions of Examples and Comparative Examples are used as the electrodeposition coating bath, and a voltage is applied between an object as an anode and composed of an anodized 6063S aluminum alloy plate having an anodized film thickness of 10 μm and a stainless steel sheet as a cathode for 3 minutes so as to obtain a dry film thickness of 10 μm to form a coated film of an electrodeposition coating composition on the object. Next, the coated object is removed from the bath, and the electrodeposition coating composition, which is excessively attached to the coated object when removed, is washed with deionized water, followed by heat curing at 180° C. for 30 minutes to obtain a cured film.

Storage Stability of Aqueous Dispersion

Tests are carried out under closed conditions and evaluations are made according to the following grades.
A: Neither sediments nor agglomerates are observed.
B: Sediments and agglomerates are observed in a little amount.
C: Sediments and agglomerates are observed in a fair amount.
D: Sediments and agglomerates are observed in a large amount.

Film Appearance

Observations of smoothness, seeding, etc. on the surface of the film are made by the naked eye. Evaluations are made according to the following grades.
A: Smoothness is good.
B: Smoothness is fair.
C: Smoothness is poor and seedings are developed.
D: Smoothness is seriously poor and seedings are developed.
*: Poor applicability to washing with water (After the completion of washing with water, defects such as stains, stripe lines and the like remain on the film.).

Film Performance

Gloss

A 60° specular reflection percentage (%) is measured by use of a glossmeter (VG-2PD, glossmeter marketed by Nippon Denshoku Kogyo Co., Ltd.).

Squares Adhesion Properties

On a coated film surface is formed 100 of 1 mm cut squares by use of a cutter knife. An adhesive cellophane tape is adhered to the squares, followed by strongly peeling the tape. The above procedures are repeated ten times to observe a number of squares remaining without being peeled off.

Alkali Resistance

A sample is dipped in a 10 wt% aqueous NaOH solution for 72 hours, followed by observing a film appearance by the naked eye to examine development of blisters according to the following grades.
A: No change is observed.
B: Blisters develop in a little amount.
C: Blisters develop in a fair amount.
D: Blisters develop in a large amount.

Acid Resistance

A sample is dipped in a 10 wt% aqueous sulfuric acid solution for 72 hours, followed by observing the film appearance by the naked eye to examine the development of blisters. Evaluations are made according to the same basis as in alkali resistance test.

Weather Resistance

An accelerated weathering test carried out by use of a weatherometer (a test instrument marketed by Suga Test Instrument Co., Ltd., "dew cycle", i.e. 60 minutes' irradiation and 60 minutes' darkness at a black panel temperature of 63° C.) for 480 hours to measure the gloss retention percentage (%) and appearance. Appearance is determined by the naked eye by comparing with that of the original film not subjected to the above test, and is graded as follows.
A: No change is observed.
B: Gloss is fairly reduced and stains develop.
C: Gloss is remarkably reduced and stains and chalking develop.

TABLE 1

| | Examples | | | | | | | | | | | Comparative Examples | | | | | |
|---|---|---|---|---|---|---|---|---|---|---|---|---|---|---|---|---|---|
| Ex. & Comp. Ex. | 1 | 2 | 3 | 4 | 5 | 6 | 7 | 8 | 9 | 10 | 11 | 1 | 2 | 3 | 4 | 5 | 6 |
| Formulations of aqueous dispersions Polycarboxylic acid resin solution | | | | | | | | | | | | | | | | | |
| Kind | (I) | (I) | (I) | (I) | (I) | (I) | (I) | (I) | (I) | (II) | (II) | (I) | (I) | (I) | (I) | (I) | (II) |
| Amount (part) | 200 | 200 | 200 | 200 | 200 | 200 | 200 | 200 | 200 | 200 | 200 | 200 | 200 | 200 | 200 | 200 | 200 |
| Compound | | | | | | | | | | | | | | | | | |
| Kind | a | a | a | a | a | b | c | a | a | a | a | — | — | a | d | e | a |
| Amount (part) | 5 | 5 | 5 | 5 | 5 | 5 | 10 | 10 | 3 | 5 | 5 | — | — | 5 | 5 | 5 | 5 |
| Triethylamine (equivalent) | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| MELAN 620 | 42 | 42 | 42 | 42 | 42 | 42 | 42 | 42 | 42 | 42 | 42 | 42 | 42 | 42 | 42 | 42 | 42 |
| Deionized water (part) | 1096 | 1096 | 1096 | 1096 | 1096 | 1096 | 1096 | 1137 | 1078 | 1096 | 1096 | 1047 | 1047 | 1096 | 1096 | 1096 | 1096 |
| Solid content of aqueous dispersion (%) | 10 | 10 | 10 | 10 | 10 | 10 | 10 | 10 | 10 | 10 | 10 | 10 | 10 | 10 | 10 | 10 | 10 |

TABLE 1-continued

| Ex. & Comp. Ex. | Examples | | | | | | | | | | | Comparative Examples | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 | 5 | 6 |
| Heating conditions of aqueous dispersion | | | | | | | | | | | | | | | | | |
| Temperature (°C.) | 40 | 50 | 60 | 70 | 80 | 70 | 80 | 50 | 70 | 50 | 70 | 20 | 80 | 20 | 70 | 70 | 20 |
| Hours | 12 | 8 | 6 | 4 | 6 | 4 | 6 | 8 | 4 | 8 | 4 | 24 | 6 | 24 | 4 | 4 | 24 |
| Resin acid value before reaction minus that after reaction | 5 | 6 | 7 | 9 | 10 | 9 | 6 | 10 | 5 | 6 | 9 | 0 | 0 | 0 | 0 | 15 | 0 |
| Storage stability of aqueous dispersion (30° C.) | | | | | | | | | | | | | | | | | |
| One month | A | A | A | A | A | A | A | A | A | A | A | A | D | A | A | C | A |
| 2 months | A | A | A | A | A | A | A | A | A | A | A | A | | B | B | C | B |
| 3 months | A | A | A | A | A | B | A | A | A | A | A | A | | B | B | D | B |
| pH of aqueous dispersion | | | | | | | | | | | | | | | | | |
| Film appearance and performances | | | | | | | | | | | | | | | | | |
| Film appearance | A | A | A | A | A | A | A | A | A | A | A | A | D | A | A | D* | A |
| Gloss | 9 | 8 | 7 | 6 | 6 | 10 | 20 | 5 | 10 | 12 | 10 | 98 | 92 | 98 | 99 | 75 | 98 |
| Squares adhesion properties | 100 | 100 | 100 | 100 | 100 | 100 | 100 | 100 | 100 | 100 | 100 | 100 | 100 | 100 | 100 | 100 | 100 |
| Alkali resistance | A | A | A | A | A | A | A | A | A | B | B | C | C | B | A | C | C |
| Acid resistance | A | A | A | A | A | A | A | A | A | B | B | C | C | B | A | C | C |
| Weather resistance | | | | | | | | | | | | | | | | | |
| Appearance | A | A | A | A | A | A | A | A | A | AB | AB | B | B | B | A | B | B |
| Gloss retention Percentage (%) | 100 | 100 | 100 | 100 | 100 | 100 | 100 | 100 | 100 | 90 | 92 | 90 | 90 | 91 | 91 | 80 | 75 |

EXAMPLE 12

To 200 parts of the polycarboxylic acid resin (III) solution are added 0.8 equivalent of triethylamine and 42 parts of MELAN 620 to be uniformly mixed, followed by adding 1047 parts of deionized water to obtain an acrylic aqueous dispersion for use in the gloss film and having a solid content of 10%. To 700 parts of the above aqueous dispersion is added 300 parts of the aqueous dispersion of Example 4, followed by uniformly mixing to obtain an aqueous dispersion of Example 12.

COMPARATIVE EXAMPLE 7

The acrylic aqueous dispersion for use in the gloss film in Example 12 is used as an aqueous dispersion of Comparative Example 7.

Storage stability and film performances of the aqueous dispersions of Example 12 and Comparative Example 7 ar shown in Table 2 respectively.

TABLE 2

| | Example 12 | Comparative Example 7 |
|---|---|---|
| Storage stability of aqueous dispersion | | |
| one month | A | A |
| 2 months | A | A |
| 3 months | A | A |
| Film appearance and performances | | |
| Film appearance | A | A |
| Gloss | 14 | 98 |
| Squares adhesion properties | 100 | 100 |
| Alkali resistance | A | D |
| Acid resistance | A | D |
| Weather resistance | | |
| Appearance | A | C |
| Gloss retention percentage (%) | 100 | 60 |

In Table 2, storage stability, film appearance and performances are evaluated in the same manner as above.

EXAMPLE 11

To 200 parts of a 50% organic solvent solution of polycarboxylic acid resin solution (I) is added 5 parts of compound (a) to be uniformly mixed, followed by heating with agitation at 60° C. for 6 hours, cooling down to 20° C., adding 42 parts of MELAN 620 and 0.8 equivalent of triethylamine to be uniformly mixed, and adding 1096 parts of deionized water to obtain an aqueous dispersion of Example 13, which has a solid content of 10%.

EXAMPLES 14–20

Aqueous dispersions of Examples 14–20 are obtained respectively in the same manner as in Example 13 according to the formulations and heating conditions shown in Table 3.

COMPARATIVE EXAMPLES 8–11

Aqueous dispersions of Comparative Examples 8–11 are obtained respectively in the same manner as in Example 13 according to the formulations and heating conditions in Table 3.

Storage stability, film appearance and film performances of Examples 13–20 and Comparative Examples 8–11 are shown in Table 3 respectively. Storage stability, film appearance and film performances are evaluated in the same manner as above.

TABLE 3

| Ex. & Comp. Ex. | Examples | | | | | | | | Comparative Examples | | | |
|---|---|---|---|---|---|---|---|---|---|---|---|---|
| | 13 | 14 | 15 | 16 | 17 | 18 | 19 | 20 | 8 | 9 | 10 | 11 |
| Organic solvent solution | | | | | | | | | | | | |

TABLE 3-continued

| Ex. & Comp. Ex. | Examples | | | | | | | | Comparative Examples | | | |
|---|---|---|---|---|---|---|---|---|---|---|---|---|
| | 13 | 14 | 15 | 16 | 17 | 18 | 19 | 20 | 8 | 9 | 10 | 11 |
| Polycarboxylic acid resin solution | | | | | | | | | | | | |
| Kind | (I) | (I) | (I) | (I) | (I) | (I) | (I) | (II) | (I) | (I) | (I) | (II) |
| Amount (part) | 200 | 200 | 200 | 200 | 200 | 200 | 200 | 200 | 200 | 200 | 200 | 200 |
| Compound | | | | | | | | | | | | |
| Kind | c | c | c | b | a | c | c | c | c | d | e | c |
| Amount (part) | 5 | 5 | 5 | 10 | 10 | 3 | 10 | 5 | 5 | 5 | 5 | 5 |
| Heating conditions | | | | | | | | | | | | |
| Temperature (°C.) | 60 | 70 | 80 | 80 | 80 | 80 | 60 | 80 | 20 | 80 | 80 | 20 |
| Hours | 6 | 4 | 2 | 2 | 2 | 2 | 6 | 2 | 24 | 2 | 2 | 24 |
| Resin acid value before reaction minus resin acid value after reaction | 7 | 9 | 10 | 6 | 6 | 5 | 10 | 10 | 0 | 0 | 15 | 0 |
| Aqueous dispersion | | | | | | | | | | | | |
| Triethylamine (equivalent) | 0.8 | 0.8 | 0.8 | 0.8 | 0.8 | 0.8 | 0.8 | 0.8 | 0.8 | 0.8 | 0.8 | 0.8 |
| MELAN 620 (part) | 42 | 42 | 42 | 42 | 42 | 42 | 42 | 42 | 42 | 42 | 42 | 42 |
| deionized water (part) | 1096 | 1096 | 1096 | 1096 | 1096 | 1078 | 1037 | 1096 | 1096 | 1096 | 1096 | 1096 |
| Solid content of aqueous dispersion (%) | 10 | 10 | 10 | 10 | 10 | 10 | 10 | 10 | 10 | 10 | 10 | 10 |
| Storage stability of aqueous dispersion (30° C.) | | | | | | | | | | | | |
| One month | A | A | A | A | A | A | A | A | A | A | C | A |
| 2 months | A | A | A | A | A | A | A | A | B | B | C | B |
| 3 months | A | A | A | B | B | A | A | A | B | B | D | B |
| Film appearance and film performances | | | | | | | | | | | | |
| Film appearance | A | A | A | A | A | A | A | A | A | A | A | A |
| Gloss | 7 | 7 | 6 | 28 | 22 | 12 | 6 | 16 | 98 | 98 | 70 | 97 |
| Squares adhesion properties | 100 | 100 | 100 | 100 | 100 | 100 | 100 | 100 | 100 | 100 | 100 | 100 |
| Alkali resistance | A | A | A | A | A | A | A | B | B | A | C | C |
| Acid resistance | A | A | A | A | A | A | A | B | B | A | C | C |
| Weather resistance | | | | | | | | | | | | |
| Appearance | A | A | A | A | A | A | A | AB | B | A | B | B |
| Gloss retention Percentage (%) | 100 | 100 | 100 | 100 | 100 | 100 | 100 | 100 | 90 | 90 | 78 | 71 |

EXAMPLE 21

The coating composition obtained in Example 4 is coated onto a steel plate treated with zinc phosphate by a bar coater to a dry film thickness of 15 μm, followed by leaving at stand at room temperature for 20 minutes, and heat curing at 180° C. for 30 minutes. The film thus obtained is highly evaluated as A for appearance, 30 for gloss, 100 for squares adhesion properties, A for alkali resistance, A for acid resistance, A for appearance as weather resistance, and 100% for gloss retention percentage (%) as weather resistance.

What is claimed is:

1. A mattable fluorine based aqueous dispersion containing, as the resin component, a reaction product of a fluorine based polycarboxylic acid resin having hydroxyl group and containing a fluorine-containing monomer component selected from a group consisting of fluoroolefin and a monomer having a perfluoroalkyl group of perfluoroalkenyl group on one terminal and having an ethylenical double bond on the other terminal with an epoxysilane compound having one epoxy group and at least one member selected from the group consisting of at least one hydroxysilane group and of at least one hydrolyzable group, directly bonded to silicon atom in one molecular, and a crosslinking agent selected from a group consisting of amino resin and block polyisocyanate compound, said reaction product being prepared by heating until an acid value of the fluorine based polycarboxylic acid resin is reduced by one or more.

2. The aqueous dispersion as claimed in claim 1 wherein the fluorine based polycarboxylic acid resin is a polymer obtained by copolymerizing hydroxy vinyl ether and/or hydroxy allyl ether and fluoroolefin as the essential monomers.

3. The aqueous dispersion as claimed in claim 1 wherein the fluorine based polycarboxylic acid resin has a number average molecular weight of 2000 to 100,000.

4. The aqueous dispersion as claimed in claim 1 wherein the fluorine based polycarboxylic acid resin has an acid value of 20 to 200.

5. The aqueous dispersion as claimed in claim 1 wherein the fluorine based polycarboxylic acid resin has a hydroxyl value of 10 to 200.

6. The aqueous dispersion as claimed in claim 1 wherein the epoxysilane compound is used in an amount of 0.1 to 20 parts by weight per 100 parts by weight of solid content of the fluorine based polycarboxylic acid resin.

7. A process for preparing a fluorine based aqueous dispersion, which process comprises dissolving or dispersing a fluorine base polycarboxylic acid resin having hydroxyl group and containing a fluorine-containing monomer component selected from a group consisting of fluoroolefin and a monomer having a perfluoroalkyl group or perfluoroalkenyl group on one terminal and having an ethylenical double bond on the other terminal and an alicyclic epoxysilane compound containing one alicyclic epoxy group and at least one member selected from the group consisting of at least one hydroxysilane group and at least one hydrolyzable group, directly bonded to silicon atom in one molecule into an organic solvent to form an organic solution or organic dispersion, followed by heating and reacting until and acid value of the fluorine based polycarboxylic acid resin is reduced by one or more, incorporating a neutralizing agent and a crosslinking agent selected from a group consisting of amino resin and block polyisocyanate compound, and by dispersing in water.

8. The process as claimed in claim 7 wherein the alicyclic epoxysilane compound contains one alicyclic epoxy group and at least one alkoxysilane group in one molecule.

9. A process for preparing a fluorine based aqueous dispersion, which process comprises dissolving or dispersing a fluorine based polycarboxylic acid resin having hydroxyl group and containing a fluorine-containing monomer component selected from a group consisting of fluoroolefin and a monomer having a perfluoroalkyl group or perfluoroalkenyl group on one terminal and having an ethylenical double bond on the other terminal into an organic solvent to form an organic solution or organic dispersion followed by adding an aliphatic epoxysilane compound containing one aliphatic epoxy group and at least one member selected from the group consisting of at least one hydroxysilane group and at least one hydrolyzable group, directly bonded to silicon atom in one molecule and adding a crosslinking agent selected from a group consisting of amino resin and block polyisocyanate compound after or before neutralization, dispersing in water, provided after neutralization when the aliphatic epoxysilane compound is added before neutralization, to form an aqueous dispersed system, and by heating and reacting the aqueous dispersed system until the acid value of the fluorine based polycarboxylic acid resin is reduced by one or more.

10. The process as claimed in claim 9 wherein the aliphatic epoxysilane compound contains one aliphatic epoxy group and at least one alkoxysilane group in one molecule.

11. A fluorine based matte anionic electrodeposition coating composition containing the fluorine based aqueous dispersion of claim 1.

* * * * *